(12) United States Patent
Houston et al.

(10) Patent No.: US 12,580,469 B2
(45) Date of Patent: Mar. 17, 2026

(54) VOLTAGE CONVERTER WITH REGULATED SWITCHING FREQUENCY AND MINIMUM ON TIME OVERRIDE

(71) Applicant: Renesas Electronics America Inc., Milpitas, CA (US)

(72) Inventors: Michael Jason Houston, Cary, NC (US); Warren Richard Schroeder, Fuquay Varina, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 206 days.

(21) Appl. No.: 18/591,723

(22) Filed: Feb. 29, 2024

(65) Prior Publication Data

US 2024/0297564 A1     Sep. 5, 2024

Related U.S. Application Data

(60) Provisional application No. 63/488,346, filed on Mar. 3, 2023.

(51) Int. Cl.
H02M 1/00 (2007.01)
H02M 1/088 (2006.01)
H02M 3/157 (2006.01)

(52) U.S. Cl.
CPC ......... H02M 1/0003 (2021.05); H02M 1/088 (2013.01); H02M 3/157 (2013.01)

(58) Field of Classification Search
CPC .... H02M 1/0003; H02M 1/088; H02M 3/157; H02M 1/0096
See application file for complete search history.

(56) References Cited

U.S. PATENT DOCUMENTS

| | | | | |
|---|---|---|---|---|
| 7,710,092 | B2 * | 5/2010 | Chapuis | H02M 3/1588 323/282 |
| 9,484,816 | B2 * | 11/2016 | Tschirhart | H02M 3/156 |
| 2017/0099011 | A1 * | 4/2017 | Freeman | H02M 7/06 |
| 2021/0351685 | A1 * | 11/2021 | Sundararaj | H02M 1/007 |

* cited by examiner

*Primary Examiner* — Thienvu V Tran
*Assistant Examiner* — Afework S Demisse
(74) *Attorney, Agent, or Firm* — SCULLY, SCOTT, MURPHY & PRESSER, P.C.

(57) ABSTRACT

Systems and methods for a voltage converter are described. A controller can include determining a pulse width modulation (PWM) on time duration being used for operating a voltage regulator. The controller can determine a switching frequency being used for operating the voltage regulator. The controller can determine whether the PWM on time duration is greater than or less than an on time reference. The controller can, in response to determining that the PWM on time duration is less than the on time reference, increase a voltage window for a PWM signal being used to operate the voltage regulator. The controller can, in response to determining that the PWM on time duration is greater than the on time reference, perform a frequency locked loop (FLL) to regulate the switching frequency.

20 Claims, 6 Drawing Sheets

<u>300</u>

400

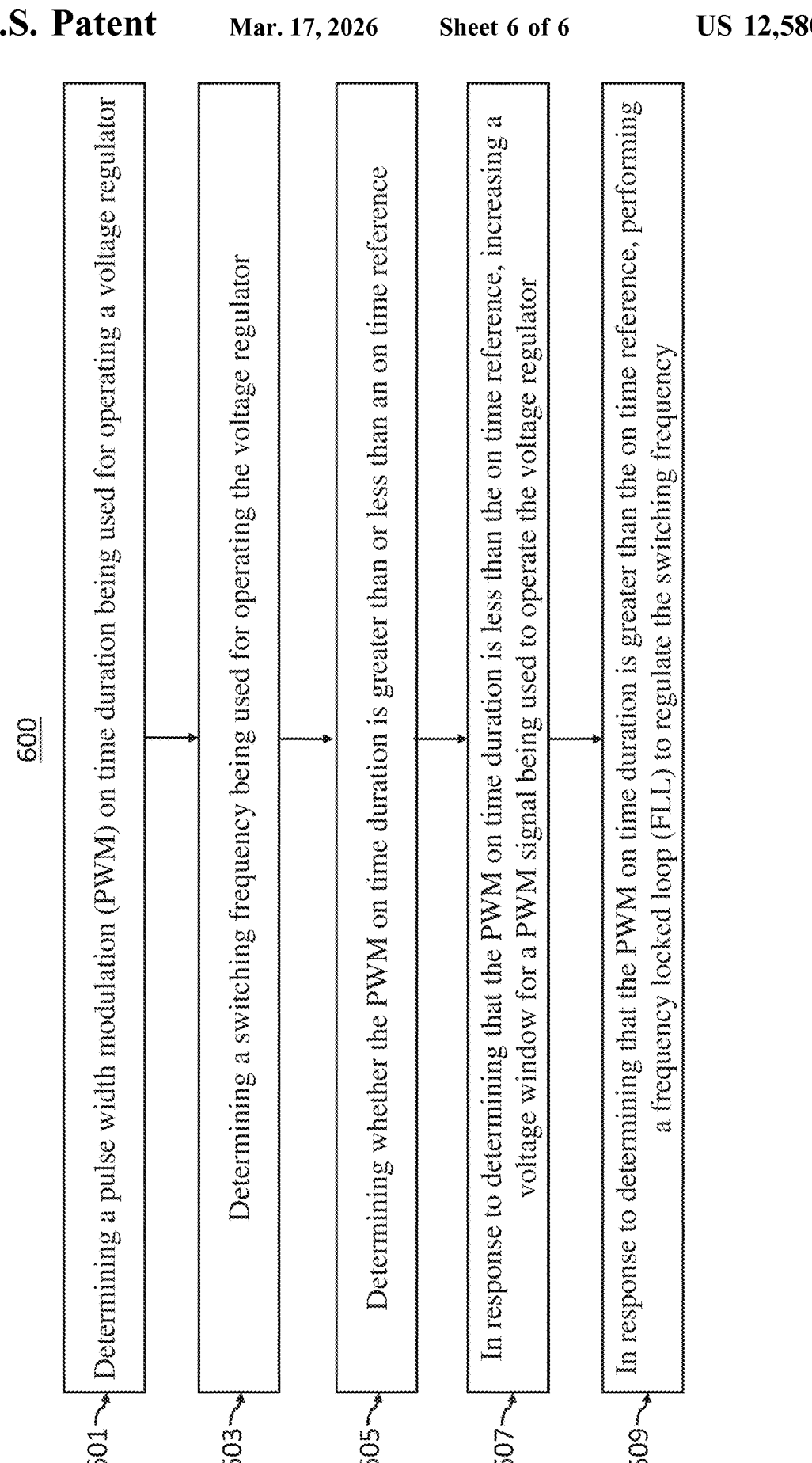

600

601 — Determining a pulse width modulation (PWM) on time duration being used for operating a voltage regulator 603 — Determining a switching frequency being used for operating the voltage regulator 605 — Determining whether the PWM on time duration is greater than or less than an on time reference 607 — In response to determining that the PWM on time duration is less than the on time reference, increasing a voltage window for a PWM signal being used to operate the voltage regulator 609 — In response to determining that the PWM on time duration is greater than the on time reference, performing a frequency locked loop (FLL) to regulate the switching frequency

Fig. 6

VOLTAGE CONVERTER WITH REGULATED SWITCHING FREQUENCY AND MINIMUM ON TIME OVERRIDE

CROSS-REFERENCE TO RELATED APPLICATION

This application is based upon and claims the benefit of priority under 35 U.S.C. 119 (e) to U.S. Patent Application No. 63/488,346 filed on Mar. 3, 2023, and titled "VOLTAGE CONVERTER WITH REGULATED SWITCHING FREQUENCY AND MINIMUM ON TIMEOVERRIDE," the entire disclosure of which is incorporated herein by reference in its entirety.

BACKGROUND

The present disclosure relates to methods and systems for voltage regulators. Particularly, a hysteretic current mode buck regulator with regulated switching frequencies and minimum on time override is described.

Voltage regulators or voltage converters, such as buck converters and boost converters, can be used for converting an input voltage to an output voltage having a different voltage level. A buck converter, or step-down converter, can convert the input voltage into a lower voltage. A boost converter, or step-up converter, can convert the input voltage into a higher voltage. A buck-boost converter can step up or step down the input voltage. A voltage converter can include multiple switches that can be turned on and off by a pulse width modulated (PWM) control signal. A duty ratio of the PWM control signal can determine an output voltage of the voltage converter.

SUMMARY

In one embodiment, a method that can implement a voltage converter with regulated switching frequency and minimum on time override is generally described. The method can include determining a pulse width modulation (PWM) on time duration being used for operating a voltage regulator. The method can further include determining a switching frequency being used for operating the voltage regulator. The method can further include determining whether the PWM on time duration is greater than or less than an on time reference. The method can further include, in response to determining that the PWM on time duration is less than the on time reference, increasing a voltage window for a PWM signal being used to operate the voltage regulator. The method can further include, in response to determining that the PWM on time duration is greater than the on time reference, performing a frequency locked loop (FLL) to regulate the switching frequency.

In one embodiment, a semiconductor device that can implement a voltage converter with regulated switching frequency and minimum on time override is generally described. The semiconductor device can include a controller configured to determine a pulse width modulation (PWM) on time duration being used for operating a voltage regulator. The controller can further be configured to determine a switching frequency being used for operating the voltage regulator. The controller can further be configured to determine whether the PWM on time duration is greater than or less than an on time reference. The controller can further be configured to, in response to the determination that the PWM on time duration is less than the on time reference, increase a voltage window for a PWM signal being used to operate the voltage regulator. The controller can further be configured to in response to the determination that the PWM on time duration is greater than the on time reference, perform a frequency locked loop (FLL) to regulate the switching frequency.

In one embodiment, a system that can implement a voltage converter with regulated switching frequency and minimum on time override is generally described. The system can include a power stage configured to convert an input voltage into an output voltage. The system can further include a driver circuit configured to drive the power stage. The system can further include a controller configured to generate a control signal for operating the driver circuit. The controller can further be configured to determine a pulse width modulation (PWM) on time duration being used for driving the power stage. The controller can further be configured to determine a switching frequency being used for driving the power stage. The controller can further be configured to determine whether the PWM on time duration is greater than or less than an on time reference. The controller can further be configured to in response to the determination that the PWM on time duration is less than the on time reference, increase a voltage window of the control signal. The controller can further be configured to in response to the determination that the PWM on time duration is greater than the on time reference, perform a frequency locked loop (FLL) to regulate the switching frequency.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 is a flow diagram illustrating another process that can implement a switching frequency regulator and a minimum on time override function in another embodiment.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
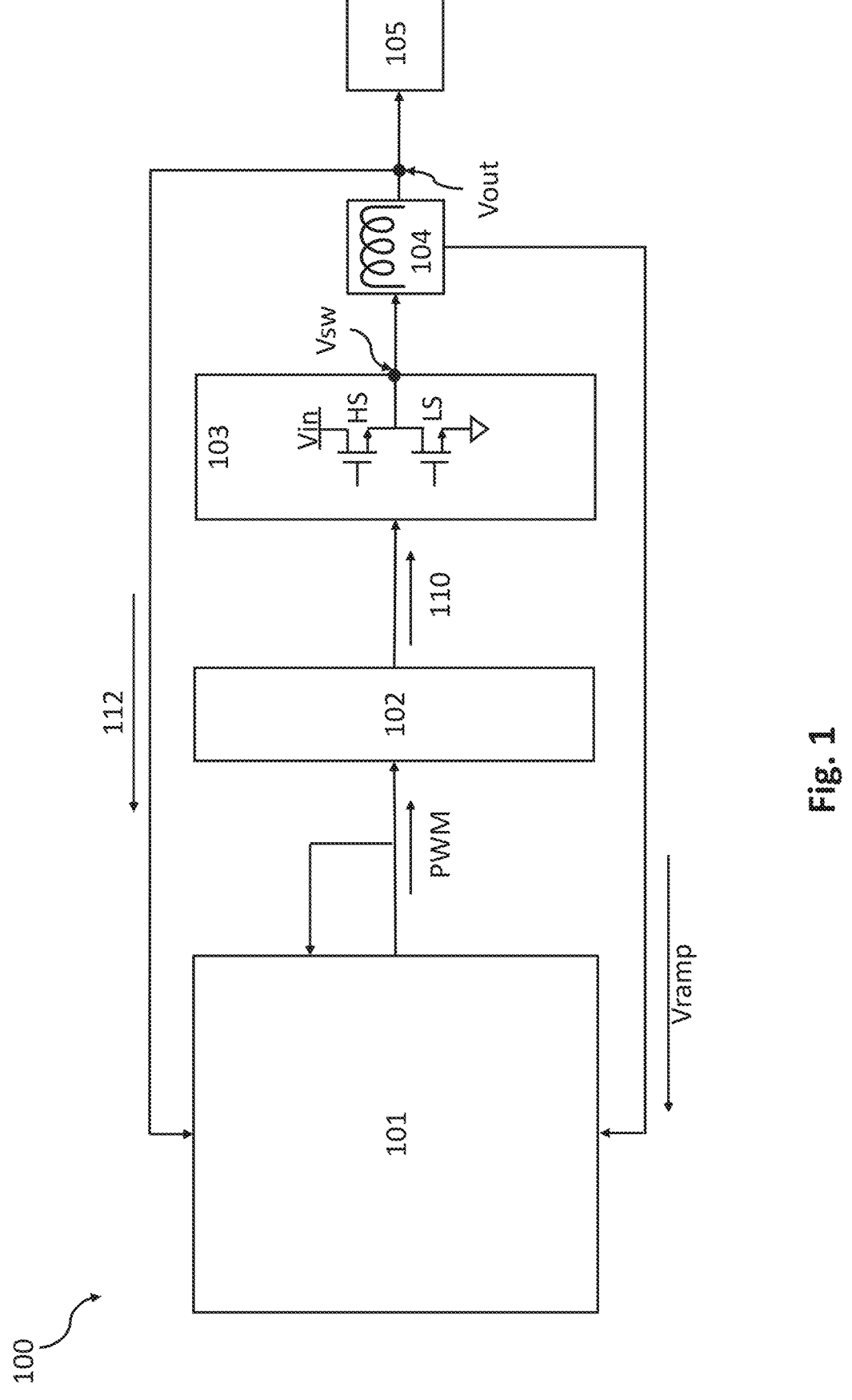
FIG. 1 is a diagram showing an example system that can implement switching frequency regulation and minimum on time override in one embodiment.

FIG. 1 is a diagram showing a system that can implement a switching frequency regulator and a minimum on time override function in one embodiment. A system 100 shown in FIG. 1 can be implemented by a voltage regulation system or voltage converter. System 100 can include a controller 101, driver integrated circuit (IC) 102, power stage 103, inductor 104, and load 105.

Controller 101 can include, for example, a processor, microcontroller, central processing unit (CPU), field-programmable gate array (FPGA) or any other circuitry that is configured to control and operate system 100. While described as a CPU in illustrative embodiments, controller 101 is not limited to a CPU in these embodiments and may comprise any other circuitry that is configured to control and operate driver IC 102. Controller 101 can be configured to generate control signals, such as pulse width modulation (PWM) or pulse frequency modulation (PFM) signals (labeled as PWM in the figures herewith) for controlling a driver IC 102 to selectively turn switches HS and LS in power stage 103 on and off. Controller 101 can control characteristics of the control signals such as the duty ratio or the switching frequency based on various conditions such as feedback from voltage Vramp to be described in more detail below.

Driver IC 102 can be configured to receive PWM signals from controller 101. Driver IC 102 can generate drive signals 110 using the received PWM signals. Driver IC 102 can drive the switches in power stage 103 via drive signals 110. Drive signals 110 can be a voltage signal having a gate voltage that can turn on or off the high-side (HS) and low-side (LS) switches of power stage 103. In one embodiment, HS and LS switches can be field-effect transistors (FETs) such as metal oxide semiconductor field effect transistors (MOSFETs). In other embodiments, HS and LS switches can be diodes or insulated-gate bipolar transistors (IGBTs). Driver IC 102 can include a driver configured to drive HS switch and another driver configured to drive LS switch in power stage 103. Driver IC 102 can be configured to provide the gate voltages or drive signals 110 to drive HS and LS switches. HS switch can be switched on while LS switch is switched off, and vice versa. When HS switch is switched on and LS switch is switched off, a voltage at a switch node Vsw between HS switch and LS switch can be pulled up to Vin such that the voltage at the switch node Vsw is equivalent to Vin. When HS is switched off and LS is switched on, the voltage at the switch node can be pulled down to ground, hence Vsw is equivalent to zero.

Power stage 103 can be configured to receive drive signals 110 from driver IC 102. The HS and LS switches can be switched on and off to generate output voltage Vout. Output voltage Vout can be outputted to, for example, a load 105 through an inductor 104. Vout can be fed back to controller 101 as a feedback signal 112 to provide controller 101 with feedback information.

In switching voltage converters, such as system 100, frequency control can impact predictable dynamics, component selection, efficiency, and stability. Control of power stage 103 minimum switch on and off time can also impact various functions such as current sense detection, stable steady state operation, overcurrent detection, etc. A voltage mode or current mode power converter may utilize a fixed switching frequency, while a hysteretic mode power converter may change a switching frequency to adjust an output voltage. In addition, in conventional systems, frequency control and minimum on and off time control can be performed by different circuits and different control loops. For example, frequency control can be performed by using a frequency locked loop (FLL) to regulate the switching frequency while PWM signals alternate between high and low voltages. However, at a low output voltage Vout and with an FLL in place, the minimum on-time of the PWM signal can significantly drop. Having an on-time below the minimum requirements can cause problems such as difficulty in sensing fault conditions.

In a situation where both the switching frequency needs to be regulated and minimum on-time needs to be increased, the two operations can clash with each other, e.g., minimum on-time needs to be increased while switching frequency is being regulated for a low output voltage Vout. To be described in more detail below, the controller 101 can be configured to receive the feedback signal 112 to regulate the switching frequency and minimum on-time. More specifically, the controller 101 can use the FLL block under specific conditions to prioritize regulation of the minimum on time rather than the switching frequency to improve efficiency, and having controller 101 regulate both minimum on time and switching frequency can reduce bill-of-material costs.

Figure 2:
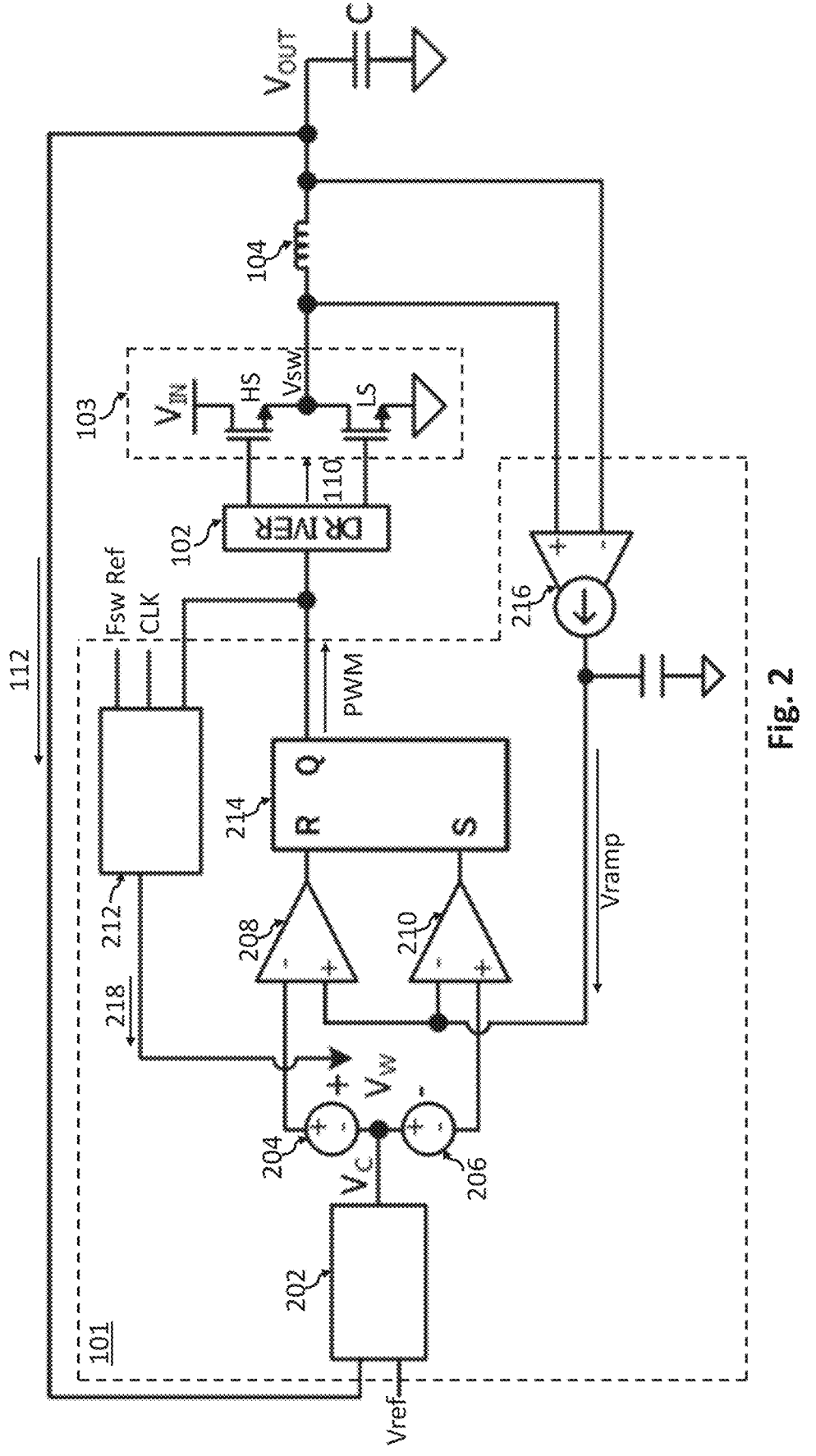
FIG. 2. is a diagram showing an example voltage regulator system that can implement a switching frequency regulator and a minimum on time override function in another embodiment.

FIG. 2. is a diagram showing an example voltage regulator system that can implement a switching frequency regulator and a minimum on time override function in one embodiment. Descriptions of FIG. 2 may reference components shown in FIG. 1. In another example embodiment, controller 101 can include at least an error amplifier 202, voltage sources 204, 206, comparators 208, 210, an S-R latch 214, an FLL circuit 212, and amplifier 216. Error amplifier 202 can be configured to receive a feedback signal 112 from the system 100 output Vout. Error amplifier 202 can also receive a predefined reference voltage Vref. Error amplifier 202 can compare the feedback signal 112 with Vref to generate an error difference and can generate a control voltage Vc based on the error difference. Voltage sources 204 and 206 can be configured to increase and decrease a voltage window Vw for the presently active PWM cycle. The voltage window can bound control voltage Vc within a voltage range defined by an upper voltage boundary Vw+ and a lower voltage boundary Vw−, and control voltage Vc can be a voltage centered between Vw+ and Vw− (e.g., median of Vw+ and Vw−). Changes to the voltage window, or changes to Vw+ and Vw−, can change the switching frequency and/or the PWM on time of the PWM signals being outputted by the S-R latch 214.

In the embodiment shown in FIG. 2, the first voltage supply 204 can control upper voltage boundary Vw+ of the voltage window Vw and the second voltage supply 206 can control a lower voltage boundary Vw− of the voltage window Vw. Comparators 208 and 210 can be configured to receive outputs from the voltage window Vw boundaries Vw+ and Vw− as well as voltage feedback information Vramp. Amplifier 216 can generate Vramp by sensing a voltage across inductor 104 and amplifying the sensed voltage based on a gain gm. Comparator 208 can receive the upper boundary voltage Vw+ at the inverting input (−) and can receive Vramp at the non-inverting input (+). Comparator 210 can receive the lower boundary voltage Vw− at the non-inverting input (+) and can receive Vramp at the inverting input (−).

The PWM signal can be in a high state (e.g., "T" or "true" state) or a low state (e.g., "F" or "false" state). Based on the PWM signal, driver IC 102 can enforce the state of the HS and LS switches. For example, while the PWM signal is in the high state, the driver IC 102 enforces HS on, and LS off. While PWM is in the low state, the driver IC 102 enforces HS off, and LS on. The voltage feedback information Vramp can emulate the current flowing through inductor 104 which is subject to the logic states of the PWM signal. For example, when switch HS is on and switch LS is off, Vramp is increasing which is indicative of current flowing through the inductor 104 increasing. When switch HS is off and switch LS is on, Vramp is decreasing which is indicative of current flowing through inductor 104 decreasing.

Comparators 208 and 210 can produce logical outputs that are indicative of the relative voltage of their (+) and (−) inputs. Whenever the voltage of the (+) input of the comparator (comparator 208 or comparator 210) is higher than the voltage of the (−) input, the comparator can output logic state "T" or "true" . . . . If the voltage of the (−) input is higher than the voltage of the (+) input, the comparator can output logic state "F" or "false".

S-R latch 214 can receive the output of comparators 208 and 210 as inputs. The output of comparator 208 can be provided to the reset pin R of S-R latch 214, and the output of comparator 210 can be provided to the set pin S of S-R latch 214. The S-R latch 214 can be configured to generate the PWM signal based on the input voltages at the set and reset pins of S-R latch 214. The PWM signals can be outputted to driver IC 102 and driver IC 102 can generate drive signals 110 to drive the power stage 103.

When S-R-latch 214 outputs a PWM signal in a high or "T" state, the driver IC 102 can turn on HS switch and turn off LS switch, and Vramp can increase. When Vramp rises above the top of the voltage window Vw+ (i.e., Vc+ voltage source 204) comparator 208 can output logic state T, which when applied to the R pin input of S-R-latch 214 will RESET the S-R latch 214. The reset of S-R latch 214 releases the PWM, i.e., outputs the PWM signal in a "F" state. The PWM signal in an "F" state turns off HS switch and turns on LS switch, via driver IC 102, causing Vramp to decrease. When Vramp descends below Vw− (i.e., Vc− voltage source 206), the R input is released, but the S-R latch 214 retains the PWM "F" state.

When SR-latch 214 outputs a PWM signal in a low or "F" state, the driver IC 102 can turn off HS switch and turn on LS switch, and Vramp will decrease. When Vramp descends below the bottom of the voltage window Vw− (i.e., Vc− supply voltage 206), comparator 210 can output logic state "T", which when applied to the S pin input of SR-latch 214 will SET S-R latch 214. The setting of S-R Latch 214 outputs the PWM signal in a "T" state, which, via driver 102, turns on HS switch and turns off LS switch, causing Vramp to now increase. When Vramp ascends above Vw−, the S input is released, but the S-R latch 214 retains the PWM "T" state.

The duration of rising Vramp in any complete cycle is designated as the on-time Ton. The duration of descending Vramp in any complete cycle is designated as the off-time Toff. The total cycle time Ton+Toff is designated as the switching period Tsw. The switching frequency is the reciprocal of Tsw, that is, Fsw=1/Tsw. The ratio of on time to total cycle time is designated the duty ratio D; D=Ton/(Ton+Toff) =Ton/Tsw. The duty ratio D is the parameter that the controller 101 modifies to regulate the output voltage Vout. Ton can be expressed as Ton=D*Tsw, or Ton=D/Fsw.

In an embodiment, Ton and Toff can be determined by the size of the voltage window Vw. For example, a larger voltage window Vw produces a larger Ton and Toff which in turn produces a larger Tsw. A smaller voltage window Vw produces a smaller Ton and Toff which in turn produces a smaller Tsw. By varying the size of voltage window Vw, a desired switching frequency Fsw can be obtained. Changing Ton by changing Vw can also change Tsw by the same proportion. Thus changing the voltage window Vw may not directly change duty ratio D.

Controller 101 can include an FLL circuit 212. FLL circuit 212 can receive the PWM signal output by the S-R latch 214, a clock signal CLK, and a predetermined or programmable reference switching frequency (Fsw Ref). The FLL circuit 212 can monitor the PWM signal in real time and determine the switching frequency Fsw using the PWM signal. By way of example, the FLL circuit 212 can be configured to measure Tsw by measuring the Ton and Toff times in the received PWM signal and summing the measured Ton and Toff. FLL circuit 212 can determine a reciprocal of Tsw to determine switching frequency Fsw of the received PWM signal. Thus, FLL circuit 212 can monitor the switching frequency Fsw using the received PWM signal. FLL circuit 212 can compare the switching frequency Fsw of the received PWM signal with the reference Fsw Ref. Based on the comparison, FLL circuit 212 can determine whether to increase the voltage window Vw to reduce Fsw or to decrease the voltage window Vw to increase Fsw. In one embodiment, FLL circuit 212 can also compare Tsw of the received PWM signal with a cycle time reference and based on this comparison, determine whether to increase the voltage window Vw or to decrease the voltage window Vw. The determination of whether to increase or decrease the voltage window Vw can be made by FLL circuit 212 at the end of each cycle because the measurement of Tsw requires that the full cycle time Tsw to be observed. In one example embodiment, the clock signal CLK being received by FLL circuit 212 can be used for measuring the switching frequency Fsw.

In response to determining whether to increase or decrease the voltage window Vw, FLL circuit 212 can adjust (e.g., increment or decrement) the voltage window Vw as indicated by a result of the determination. The adjustment of the voltage window Vw can be in effect for the current switching cycle, or switching cycle n. The voltage window size decision (e.g., amount to increment or decrement) and any adjustment to the size of the voltage window, can be instantaneous, thus the decision from current cycle can be in effect for next cycle, or cycle n+1, as well. In one embodiment, the FLL circuit 212 can output a voltage signal 218 that can be used by controller 101 to adjust the voltage window Vw boundaries Vw+ and Vw−. If the Fsw Ref is less than the measured switching frequency from the PWM signal, then the voltage window can be decreased to increase the switching frequency Fsw. The FLL circuit 212 can decrease the voltage window by decreasing the voltage source 204 to reduce the upper boundary Vw+ and decreasing the voltage source 206 to the raise boundary Vw−, thus creating a narrower (e.g., decreased) voltage window Vw. If the Fsw Ref is greater than the measured switching frequency from the PWM signal, then the voltage window can be increased to reduce the switching frequency Fsw. The FLL circuit 212 can increase the voltage window by increasing the voltage source 204 to raise the upper boundary Vw+ and increasing the voltage source 206 to increase the difference between Vc and Vw−, thus, lowering the lower boundary Vw− and creating a wider (e.g., increased) voltage window Vw. The amount of adjustments made to voltage sources 204, 206 for adjusting voltage window Vw can be equal or can be different from one another depending on a desired implementation of system 100. In one embodiment, if a desired implementation requires voltage window Vw to be symmetric with Vc at the center, then the amount of adjustments made to voltage sources 204, 206 can be equivalent to maintain symmetry of the voltage window centered at Vc. In another embodiment, if a desired implementation does not require voltage window Vw to be symmetric, then the amount of adjustments made to voltage sources 204, 206 can be different. By way of example, to adjust voltage window without adjusting voltage sources 204, 206 with equal adjustments, FLL 212 can apply voltage signal 218 on either one of voltage sources 204, 206, instead of both, to adjust the voltage window.

FLL circuit 212 can also be configured to adjust the voltage window Vw to increase the on-time duration of the PWM signal. FLL circuit 212 can be configured to determine whether the minimum on time duration of the PWM signal crosses a predefined threshold. The predefined threshold can be a programmable minimum on-time (Ton Ref) that represents the minimum time a switch needs to be on for controller 101 to function correctly, a limitation due to limitations on the rate of switch transition time, or other operational constraints. If the on time is lower than a Ton Ref, then controller 101 can increase the voltage window Vw+, i.e., increasing the voltage source 204 to raise the upper boundary Vw+ and increasing the voltage source 206 to lower the lower boundary Vw−. If the on time is greater than a pre-determined reference on-time duration, then FLL circuit 212 can continue to regulate the switching frequency of system 100. By this decision precedence, the constraint of minimum on-time supersedes the regulation of Fsw; Fsw is controlled, subject to the higher priority constraint that minimum on-time is not violated.

The switching frequency Fsw, as determined by the window size Vw, can deviate from the expected value due to various nonidealities in system 100. These nonidealities can vary with operating conditions such as desired output voltage, the Vin supply voltage, regulator load current, dissipation of power in lossy components, the number of active phases in a multi-phase controller, and temperature, and/or other conditions that can alter switching frequency. The FLL circuit 212 provides a frequency regulation mechanism that overcomes the uncertainties that impact switching frequency Fsw accuracy.

The duty ratio D, which determines the output voltage, must be adjusted for its own set of nonidealities that contribute to output voltage accuracy, which includes power loss elements and load variations along with other practical deviations from ideal performance. But the duty ratio D of controller 101 is primarily determined by the ratio of the desired output voltage to the input supply voltage, by the approximation D=Vout/Vin. Recall that Ton=Tsw*D=D/Fsw. So for a given Fsw, Ton=(Vout/Vin)/Fsw. For the condition of Vin sufficiently larger than Vout, and if Fsw is sufficiently high, Ton can be very small, potentially violating the minTon constraint. In another embodiment, Ton can be estimated instead of being measured. An estimation can be made based on various parametric values such as the measure of Vin and Vout. The voltage regulation of the Vout depends on both Vin and the desired Vout level. When the minimum on-time (minTon) needs to be met, but is limited by Vin and the desired Vout level, the switching frequency Fsw needs to be decreased. This adjustment is made by increasing the voltage window Vw. This compromise is necessary to ensure the proper functioning of the voltage regulator. Thus, the regulation of the switching frequency Fsw is determined by the need to meet the minimum on-time constraint.

The embodiments shown herein can allow a controller to perform both regulation of PWM on-time and switching frequency, where the PWM on time regulation can be prioritized over switching frequency regulation. The priority given to the PWM on-time regulation can avoid issues caused by low PWM on-time in low duty ratio operating conditions.

Figure 3:
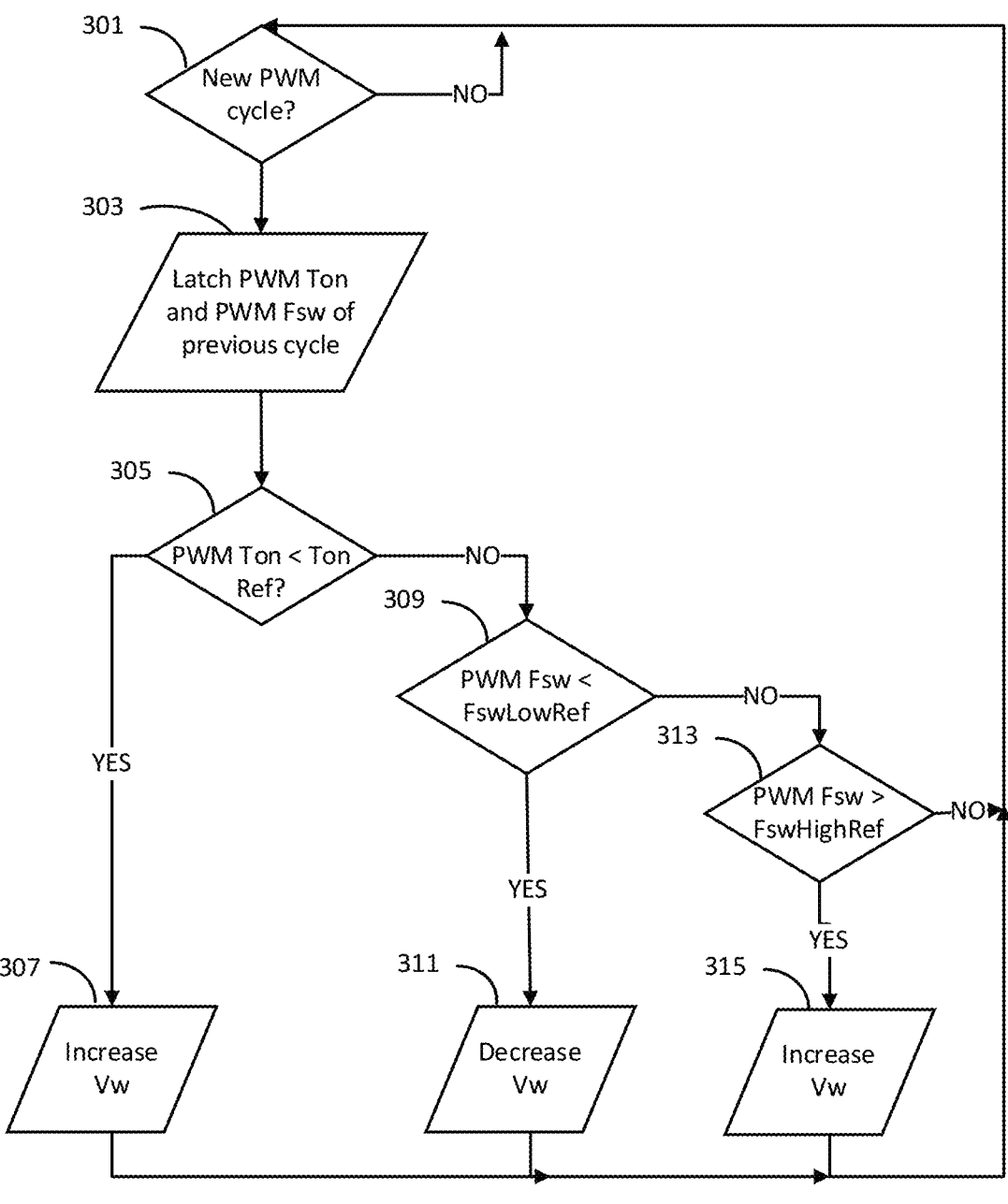
FIG. 3 is a flow diagram illustrating a process that can implement a switching frequency regulator and a minimum on time override function in one embodiment.

FIG. 3 is a flow diagram illustrating a process to implement a switching frequency regulator and a minimum on time override function in one embodiment. Descriptions of FIG. 3 may reference components shown in FIGS. 1-2. The process 300 can include one or more operations, actions, or functions as illustrated by one or more of blocks 301, 303, 305, 307, 309, 311, 313, and 315. Although illustrated as discrete blocks, various blocks can be divided into additional blocks, combined into fewer blocks, eliminated, performed in different order, or performed in parallel, depending on the desired implementation.

Process 300 can be implemented by a voltage regulator system. For example, controller 101 of system 100 can perform process 300. Process 300 can begin at block 301. At block 301, controller 101 can determine whether a new PWM cycle has occurred. By way of example, controller 101 can detect a rising edge of the PWM signal and the rising edge is an indication of a new PWM cycle. If controller 101 does not detect a new PWM cycle (301: NO), process 300 can loop around block 301 until a new PWM cycle begins.

If controller 101 determines a new PWM cycle has begun at block 301 (301: YES), then process 300 can continue from block 301 to block 303. At block 303, controller 101 can determine an on time PWMTon and a switching frequency Fsw of the previously completed PWM cycle, or PWM cycle n−1. The on time PWMTon can be a duration in time of a PWM signal in the PWM cycle n−1 being in the "on" state and the switching frequency Fsw can be the rate at which the HS and LS switches switch on and off to generate the PWM signal in PWM cycle n−1. Controller 101 can latch the determined on time PWMTon and the latched switching frequency Fsw. Process 300 can continue from block 303 to block 305. At block 305, controller 101 can determine whether the latched PWMTon is less than Ton Ref (see FIG. 2). The comparison being made by controller 101 is to check whether the minimum on-time operation needs to override the frequency regulation operation. If the latched PWMTon is less than the Ton Ref (305: YES), then the minimum on-time function needs to be in operation, and process 300 can continue from block 305 to block 307

At block 307, controller 101 can increase the voltage window Vw. By increasing the voltage window Vw, the PWM Ton can be increased, (and also Toff, and so also Tsw, in the same proportion as the increase in Ton, thus preserving D). This decision precedes, and if taken, supersedes the regulation of Fsw, ensuring that the minimum on-time function has higher priority that Fsw regulation. Therefore, the regulation of PWM on time is prioritized over regulation of switching frequency.

If in block 305 the PWMTon is greater than the Ton Ref (305: NO), then process 300 can continue from block 305 to block 309. The determination that PWMTon is greater than the Ton Ref means that the minimum on-time function does not need to be in operation and the FLL can continue regulating the switching frequency. At block 309, controller 101 is configured to determine whether the latched PWM switching frequency is less than a low reference switching frequency FswLowRef. In an example embodiment, there can be two reference switching frequencies. A low reference switching frequency FswLowRef and high reference switching frequency FswHighRef that is greater than FswLowRef. If the latched PWM switching frequency is less than the FswLowRef (309: YES), then process 300 can continue from block 309 to 311. Note that the comparisons being made to the two switching frequency references can regulate Fsw within a defined range such that dithering between the switching frequency boundaries can be reduced. The range between FswLowRef and FswHighRef can vary depending on various conditions. In one or more embodiments, there can be a predefined nominal switching frequency, and a range of frequencies around the nominal frequency can be assigned as a threshold range of frequencies where the switching frequency can impact the mechanisms and operational parameters of system 100. The range of frequencies can be used for setting the references FswLowRef and FswHighRef.

At block 311, controller 101 can decrease the voltage window. Decreasing the voltage window can increase the switching frequency to obtain a regulated switching frequency level between FswLowRef and FswHighRef. If the latched PWM switching frequency is greater than the FswLowRef (309: NO), then process 300 can continue from block 309 to 313. At block 313, controller 101 is configured to determine whether the PWM switching frequency is greater than FswHighRef. If the PWM switching frequency is greater than the FswHighRef (313: YES), then the process 300 can continue from block 313 to 315. At block 315, controller 101 is configured to increase the voltage window Vw. Increasing the voltage window would decrease the switching frequency to obtain a regulated switching frequency level between FswLowRef and FswHighRef. If the PWM switching frequency is less than the FswHighRef (313: NO), then controller 101 does not need to adjust the voltage window and can return back to block 301 to wait for the next PWM cycle to begin.

Figure 4:
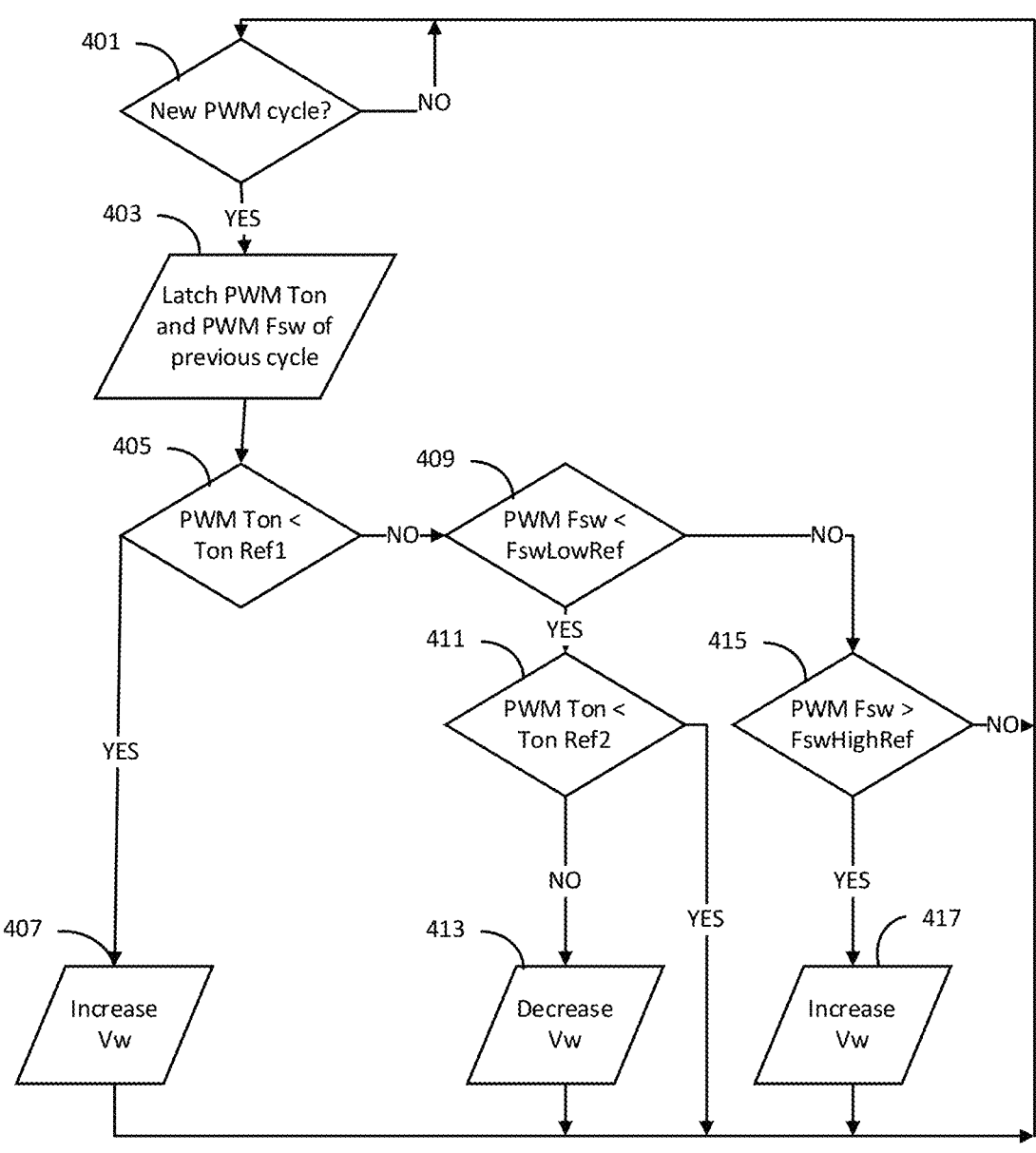
FIG. 4 is a flow diagram illustrating another process that can implement a switching frequency regulator and a minimum on time override function in another embodiment.

FIG. 4 is a flow diagram illustrating another process to implement a switching frequency regulator and a minimum on time override function in another embodiment. Descriptions of FIG. 4 may reference components shown in FIGS. 1-3. The process 400 can include one or more operations, actions, or functions as illustrated by one or more of blocks 401, 403, 405, 407, 409, 411, 413, 415, and 417, Although illustrated as discrete blocks, various blocks can be divided into additional blocks, combined into fewer blocks, eliminated, performed in different order, or performed in parallel, depending on the desired implementation.

Process 400 can be implemented by a voltage regulator system. For example, controller 101 of system 100 can perform process 400. Process 400 can begin at block 401. At block 401, controller 101 can determine whether a new PWM cycle has occurred. By way of example, controller 101 can detect a rising edge of the PWM signal and the rising edge is an indication of a new PWM cycle. If controller 101 does not detect a new PWM cycle (401: NO), process 400 can loop around block 401 until a new PWM cycle begins.

If controller 101 determines a new PWM cycle has begun at block 401 (401: YES), then process 400 can continue from block 401 to block 403. At block 403, controller 101 can determine an on time PWMTon and a switching frequency Fsw of the previously completed PWM cycle, or PWM cycle n−1. The on time PWMTon can be a duration in time of a PWM signal in the PWM cycle n−1 being in the "on" state and the switching frequency Fsw can be the rate at which the HS and LS switches switch on and off to generate the PWM signal in the PWM cycle n−1. Controller 101 can latch the determined on time PWMTon and the latched switching frequency Fsw.

At block 405, controller 101 can determine whether the latched PWMTon is less than a first reference on time (Ton Ref1). Ton Ref1 is a first predefined threshold that can be programmable and represents the minimum time a switch needs to be on for controller 101 to operate correctly. If the latched PWMTon is less than the Ton Ref1 (405: YES), then process 400 can continue from block 405 to block 407.

At block 407, controller 101 is configured to increase the voltage window Vw. By increasing the voltage window Vw, the PWM Ton can be increased. If the PWMTon is greater than the Ton Ref1 (405: NO), then process 400 can continue from block 405 to block 409.

At block 409, controller 101 can return to regulating switching frequency since controller 101 has determined that the minimum on-time constraint has been satisfied, so the override operation is no longer necessary. Controller 101 can determine whether the PWM switching frequency is less than the FswLowRef. If the PWM switching frequency is less than the FswLowRef (409: YES), then process 400 can continue from block 409 to block 411.

At block 411, controller 101 can determine whether the PWMTon is less than a second reference on time (Ton Ref2). Ton Ref2 is a second predefined threshold that can be programmable and represents a second reference on-time that is greater than the first reference on-time TonRef1. The two reference on-times Ton Ref1, Ton Ref2, can create a window boundary that allows controller 101 to continue monitoring minimum on-time while the on-time is within the on-time window. For example, when the measured minimum on-time is hovering around the threshold level e.g., Ton Ref1. Note that the comparisons being made to the two PWM on time references can regulate PWMTon within a defined range such that jittering at the on time boundaries can be reduced.

If the latched PWMTon is less than the Ton Ref2 (411: YES), then process 400 can continue from block 411 to block 401 to wait for a new PWM cycle (cycle n+2).

If the latched PWMTon is greater than the Ton Ref2 (411: NO), then process 400 can continue from block 411 to block 413. At block 413, controller 101 can decrease the voltage window. Returning to decision block 409, if the PWM switching frequency is greater than the FswLowRef (409: NO), then process 400 can continue from block 409 to 415. At block 415, controller 101 can determine whether PWM switching frequency is greater than the FswHighRef. If the PWM switching frequency is greater than the FswHighRef (415: YES), then the process 400 can continue from block 415 to 417. At block 417, controller 101 is configured to increase the voltage window Vw. If the PWM switching is less than the FswHighRef (415: NO), then controller 101 does not need to adjust the voltage window and can return back to block 401 to wait for the next PWM cycle (PWM cycle n+1) to begin. As shown in FIG. 4, after latching PWM Ton and Fsw in block 403, instead of performing a FLL, controller 101 checks whether the PWM on time (PWM Ton) is within a desired range (e.g., between Ton Ref 1 and Ton Ref 2). Therefore, the regulation of PWM on time is prioritized over regulation of switching frequency. Note that the comparisons being made to the two switching frequency references can regulate Fsw within a defined range such that dithering at the switching frequency boundaries can be reduced.

Figure 5:
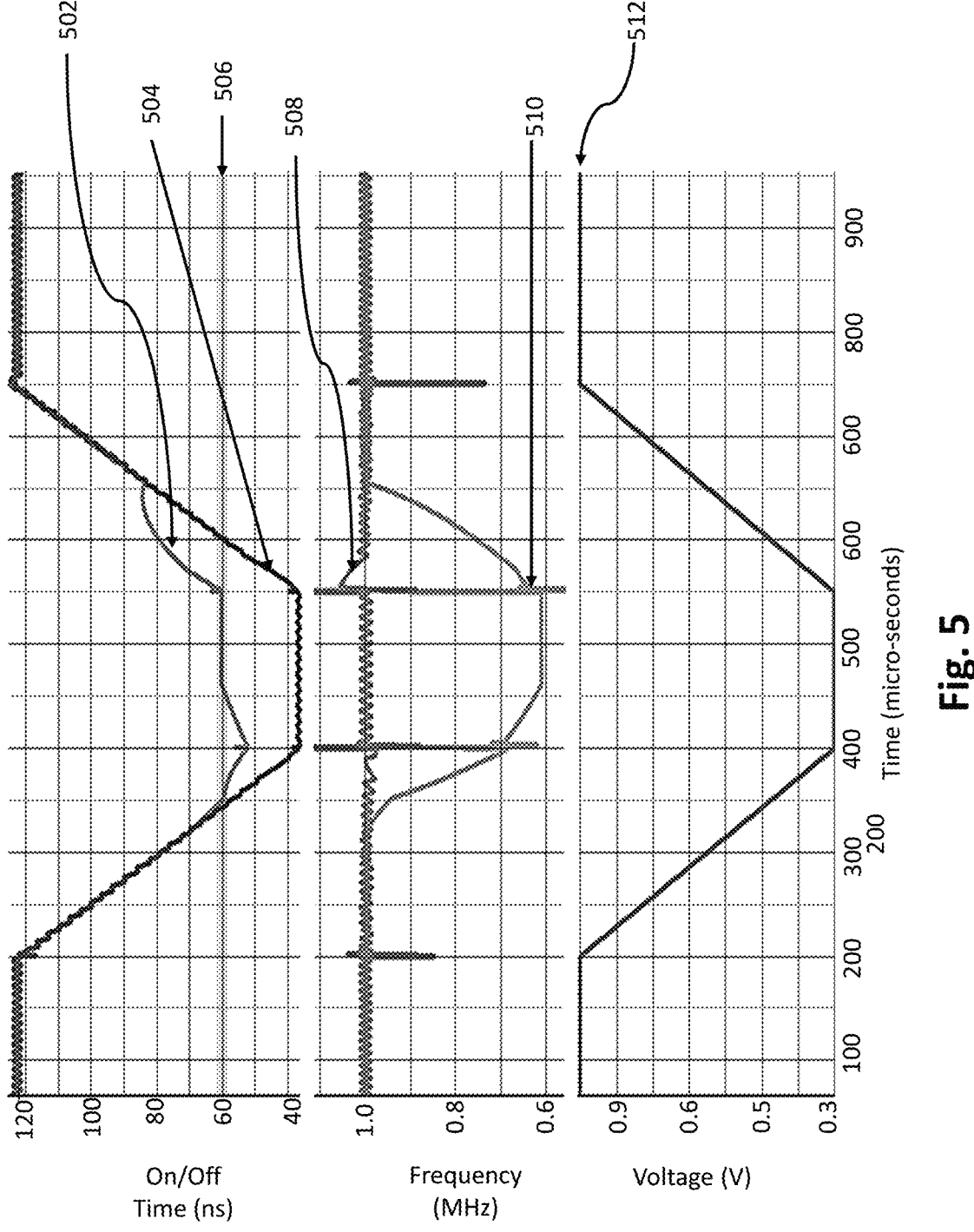
FIG. 5 is a diagram illustrating an implementation of a switching frequency regulator and a minimum on time override function in another embodiment.

Note that in process 400, the switching frequency test in block 409 is performed prior to the Ton_ref2 test (e.g., block 411) to prevent a condition where Ton is between Ton_ref1 and Ton_ref2 and the voltage window needs to be increased to reduce the switching frequency. Further, the switching frequency test being performed prior to the Ton_ref2 test can allow the voltage window to be reduced (e.g., block 413) when the switching frequency is too low (e.g., 409: YES). If the switching frequency is too high (415: YES), then the voltage window will increase regardless of the result of the Ton_ref2 test FIG. 5 is a diagram illustrating an implementation of a switching frequency regulator and a minimum on time override function in another embodiment. Descriptions of FIG. 5 may reference components shown in FIGS. 1-4. In an example embodiment, line 502 illustrates the minimum on-time with switching frequency regulator and a minimum on time override function implemented. Line 504 illustrates the minimum on-time without switching frequency regulator and a minimum on time override function implemented. Line 506 represents the predefined Ton Ref. Line 508 illustrates the switching frequency without switching frequency regulator and a minimum on time override function implemented. Line 510 illustrates the switching frequency with switching frequency regulator and a minimum on time override function implemented. Line 512 illustrates the voltage output Vout.

In an example embodiment, the starting condition begins with a programmed switching frequency of 1 MHz with an output voltage Vout of 1.0 V depicted by line 512 for 200 microseconds. While Vout is at 1.0 V, the measured PWM Ton depicted by line 502 and 504 can be at 120 nanoseconds. During time 200 microseconds to 300 microseconds, Vout changes from 1.0 V to 0.3 V. When system 100 utilizes an FLL to regulate the switching frequency, lines 504 and 508 depict how the PWM Ton and switching frequency may react to the utilization of the FLL without Min_Ton override control. When Vout reaches 0.3V, the PWM Ton for line 504 drops to less than 40 nanoseconds which can cause switching operation issues and regulation issues, including current sense problems and difficulty in sensing fault conditions. As shown in FIG. 5, the predetermined Ton Ref was defined as 60 nanoseconds shown by line 506. Ton Ref can be used to determine when to switch operations from using a switching frequency regulation function to a minimum on time override function. Thus, when the PWM Ton drops below 60 nanoseconds, as illustrated by line 502, controller 101 can switch operations to prioritize increasing the on time to be above the 60 nanosecond threshold. As shown by line 502, the minimum on time override function takes over and corrects the PWM Ton to be at, at least, equal to Ton Ref. Without the minimum on time override, the on-time continues at under 40 nanoseconds as shown by line 504. As illustrated by line 510, the switching frequency decreases to almost 0.6 MHz because controller 101 is regulating the on time instead of the switching frequency. When Vout increases back up to 1.0 V, controller 101 can switch operations from the minimum on time override function back to the switching frequency regulation function. This can be seen by line 510 increasing back to 1 MHz and line 502 increasing to a 120 nanosecond on time duration.

FIG. 6 is a flow diagram illustrating another process to implement a switching frequency regulator and a minimum on time override function in another embodiment. Descriptions of FIG. 6 may reference components shown in FIGS. 1-6. The process 600 can include one or more operations, actions, or functions as illustrated by one or more of blocks 601, 603, 605, 607, and 609. Although illustrated as discrete blocks, various blocks can be divided into additional blocks, combined into fewer blocks, eliminated, performed in different order, or performed in parallel, depending on the desired implementation.

Process 600 can be implemented by a voltage regulator system. For example, controller 101 of voltage regulator system 100 can perform process 600. Process 600 can begin at block 601. At block 601, the controller can determine a pulse width modulation (PWM) on time duration being used for operating a voltage regulator. In one embodiment, the voltage regulator can be a hysteretic current mode buck regulator.

Process 600 can continue from block 601 to 603. At block 603, the controller can further determine a switching frequency being used for operating the voltage regulator. In one embodiment, the controller can determine the switching frequency by determining a PWM off time duration being used for operating the voltage regulator, summing the PWM on time and the PWM off time to determine a cycle time, and determining a reciprocal of the cycle time to determine the switching frequency.

Process 600 can continue from block 603 to 605. At block 605, the controller can further determine whether the PWM on time duration is greater than or less than an on time reference.

Process 600 can continue from block 605 to 607. At block 607, the controller can further in response to determining that the PWM on time duration is less than the on time reference, increasing a voltage window for a PWM signal being used to operate the voltage regulator. In one embodiment, an increase in the voltage window for the PWM signal can decrease the switching frequency and a decrease the voltage window for the PWM signal can increase the switching frequency.

Process 600 can continue from block 607 to 609. At block 609, the controller can further in response to determining that the PWM on time duration is greater than the on time reference, performing a frequency locked loop (FLL) to regulate the switching frequency.

In one embodiment, performing the FLL can include determining whether the switching frequency is greater than or less than a first reference switching frequency. Performing the FLL can further include in response to determining that the switching frequency is less than the first reference switching frequency, decreasing the voltage window. Performing the FLL can further include in response to determining that the switching frequency is greater than the first reference switching frequency, determining whether the switching frequency is greater than or less than a second reference switching frequency, wherein the second reference switching frequency is greater than the first reference switching frequency. Performing the FLL can further include, in response to determining that the switching frequency is greater than the second reference switching frequency, increasing the voltage window.

In one embodiment, the controller can further determine that a new PWM cycle has occurred. The controller can further determine the PWM on time duration comprises determining a PWM on time of a PWM signal in a completed PWM cycle previous to the new PWM cycle. The controller can further determine the switching frequency comprises determining a switching frequency of the PWM signal in the completed cycle PWM previous to the new PWM cycle.

In one embodiment, the on time reference can be a first on time reference and performing the FLL can include, in response to determining that the PWM on time duration is greater than the first on time reference, the controller can determine whether the switching frequency is greater than or less than a first reference switching frequency. In response to determining that the switching frequency is less than the first reference switching frequency, the controller can determine whether the PWM on time duration is greater than or less than a second on time reference, wherein the second on time reference is greater than the first on time reference. In response to determining that the PWM on time duration is greater than the second on time reference, the controller can decrease the voltage window. In response to determining that the switching frequency is greater than the first reference switching frequency, the controller can determine whether the switching frequency is greater than or less than a second reference switching frequency. In response to determining that the switching frequency is greater than the second reference switching frequency, the controller can increase the voltage window.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a voltage regulator, the method comprising:

determining a pulse width modulation (PWM) on time duration being used for operating the voltage regulator;

determining a switching frequency being used for operating the voltage regulator;

determining whether the PWM on time duration is greater than or less than an on time reference;

in response to determining that the PWM on time duration is less than the on time reference, increasing a voltage window for a PWM signal being used to operate the voltage regulator; and in response to determining that the PWM on time duration is greater than the on time reference, performing a frequency locked loop (FLL) to regulate the switching frequency.

2. The method of claim 1, wherein performing the FLL comprises:

determining whether the switching frequency is greater than or less than a first reference switching frequency;

in response to determining that the switching frequency is less than the first reference switching frequency, decreasing the voltage window;

in response to determining that the switching frequency is greater than the first reference switching frequency, determining whether the switching frequency is greater than or less than a second reference switching frequency, wherein the second reference switching frequency is greater than the first reference switching frequency; and in response to determining that the switching frequency is greater than the second reference switching frequency, increasing the voltage window.

3. The method of claim 1, further comprising:

determining that a new PWM cycle has occurred;

determining the PWM on time duration comprises determining a PWM on time of a PWM signal in a completed PWM cycle previous to the new PWM cycle; and determining the switching frequency comprises determining a switching frequency of the PWM signal in the completed PWM cycle previous to the new PWM cycle.

4. The method of claim 2, wherein determining the switching frequency comprises:

determining a PWM off time duration being used for operating the voltage regulator;

summing the PWM on time and the PWM off time to determine a cycle time; and determining a reciprocal of the cycle time to determine the switching frequency.

5. The method of claim 1, wherein the on time reference is a first on time reference, and performing the FLL comprises:

in response to determining that the PWM on time duration is greater than the first on time reference, determining whether the switching frequency is greater than or less than a first reference switching frequency;

in response to determining that the switching frequency is less than the first reference switching frequency, determining whether the PWM on time duration is greater than or less than a second on time reference, wherein the second on time reference is greater than the first on time reference;

in response to determining that the PWM on time duration is greater than the second on time reference, decreasing the voltage window;

in response to determining that the switching frequency is greater than the first reference switching frequency, determining whether the switching frequency is greater than or less than a second reference switching frequency; and in response to determining that the switching frequency is greater than the second reference switching frequency, increasing the voltage window.

6. The method of claim 1, wherein:

increasing the voltage window for the PWM signal decreases the switching frequency; and decreasing the voltage window for the PWM signal increases the switching frequency.

7. The method of claim 1, wherein the voltage regulator is a hysteretic current mode buck regulator.

8. A semiconductor device comprising:

a controller configured to:

determine a pulse width modulation (PWM) on time duration being used for operating a voltage regulator;

determine a switching frequency being used for operating the voltage regulator;

determine whether the PWM on time duration is greater than or less than an on time reference;

in response to the determination that the PWM on time duration is less than the on time reference, increase a voltage window for a PWM signal being used to operate the voltage regulator; and in response to the determination that the PWM on time duration is greater than the on time reference, perform a frequency locked loop (FLL) to regulate the switching frequency.

9. The semiconductor device of claim 8, wherein the controller is further configured to:

determine whether the switching frequency is greater than or less than a first reference switching frequency;

in response to the determination that the switching frequency is less than the first reference switching frequency, decrease the voltage window;

in response to the determination that the switching frequency is greater than the first reference switching frequency, determine whether the switching frequency is greater than or less than a second reference switching frequency, wherein the second reference switching frequency is greater than the first reference switching frequency; and in response to the determination that the switching frequency is greater than the second reference switching frequency, increase the voltage window.

10. The semiconductor device of claim 8, wherein the controller is further configured to:

determine that a new PWM cycle has occurred;

determine the PWM on time duration by a determination of a PWM on time of a PWM signal in a completed PWM cycle previous to the new PWM cycle; and determine the switching frequency by a determination of a switching frequency of the PWM signal in the completed PWM cycle previous to the new PWM cycle.

11. The semiconductor device of claim 8, wherein the controller is configured to:

determine a PWM off time duration being used for operating the voltage regulator;

sum the PWM on time and the PWM off time to determine a cycle time; and determine a reciprocal of the cycle time to determine the switching frequency.

12. The semiconductor device of claim 8, wherein the on time reference is a first on time reference, and the controller is further configured to:

in response to determination that the PWM on time duration is greater than the first on time reference, determine whether the switching frequency is greater than or less than a first reference switching frequency;

in response to determination that the switching frequency is less than the first reference switching frequency, determine whether the PWM on time duration is greater than or less than a second on time reference, wherein the second on time reference is greater than the first on time reference;

in response to determination that the PWM on time duration is greater than the second on time reference, decrease the voltage window;

in response to determination that the switching frequency is greater than the first reference switching frequency, determine whether the switching frequency is greater than or less than a second reference switching frequency; and in response to determination that the switching frequency is greater than the second reference switching frequency, increase the voltage window.

13. The semiconductor device of claim 8, wherein:

an increase of the voltage window for the PWM signal decreases the switching frequency; and a decrease of the voltage window for the PWM signal increases the switching frequency.

14. The semiconductor device of claim 8, wherein a power stage, a driver circuit and the controller are parts of a hysteretic current mode buck regulator.

15. A system comprising:

a power stage configured to convert an input voltage into an output voltage;

a driver circuit configured to drive the power stage; and a controller configured to:

generate a control signal for operating the driver circuit;

determine a pulse width modulation (PWM) on time duration being used for driving the power stage;

determine a switching frequency being used for driving the power stage;

determine whether the PWM on time duration is greater than or less than an on time reference;

in response to determination that the PWM on time duration is less than the on time reference, increase a voltage window of the control signal; and in response to determination that the PWM on time duration is greater than the on time reference, perform a frequency locked loop (FLL) to regulate the switching frequency.

16. The system of claim 15, wherein the controller is further configured to:

determine whether the switching frequency is greater than or less than a first reference switching frequency;

in response to the determination that the switching frequency is less than the first reference switching frequency, decrease the voltage window;

in response to the determination that the switching frequency is greater than the first reference switching frequency, determine whether the switching frequency is greater than or less than a second reference switching frequency, wherein the second reference switching frequency is greater than the first reference switching frequency;

in response to the determination that the switching frequency is less than the second reference switching frequency, maintain the voltage window; and

in response to the determination that the switching frequency is greater than the second reference switching frequency, increase the voltage window.

17. The system of claim 15, wherein the on time reference is a first on time reference, and the controller is further configured to:

in response to determination that the PWM on time duration is greater than the first on time reference, determine whether the switching frequency is greater than or less than a first reference switching frequency;

in response to determination that the switching frequency is less than the first reference switching frequency, determine whether the PWM on time duration is greater than or less than a second on time reference, wherein the second on time reference is greater than the first on time reference;

in response to determination that the PWM on time duration is greater than the second on time reference, decrease the voltage window;

in response to determination that the switching frequency is greater than the first reference switching frequency, determine whether the switching frequency is greater than or less than a second reference switching frequency; and in response to determination that the switching frequency is greater than the second reference switching frequency, increase the voltage window.

18. The system of claim 15, wherein the controller is further configured to:

determine that a new PWM cycle has occurred;

determine the PWM on time duration by a determination of a PWM on time of a PWM signal in a completed PWM cycle previous to the new PWM cycle; and determine the switching frequency by a determination of a switching frequency of the PWM signal in the completed PWM cycle previous to the new PWM cycle.

19. The system of claim 15, wherein the controller is further configured to:

determine a PWM off time duration being used for driving the power stage;

sum the PWM on time and the PWM off time to determine a cycle time; and determine a reciprocal of the cycle time to determine the switching frequency.

20. The system of claim 15, wherein:

an increase of the voltage window of the control signal decreases the switching frequency; and a decrease of the voltage window of the control signal increases the switching frequency.

* * * * *